United States Patent [19]

Harte

[11] 4,087,556

[45] May 2, 1978

[54] FOLIC ACID ANIMAL FEED MATERIALS AND PROCESSES

[75] Inventor: Kevin Michael Harte, Portlaoise, Ireland

[73] Assignee: Chemische Industrie Randstad, N.V., Curacao, Netherlands Antilles

[21] Appl. No.: 753,431

[22] Filed: Dec. 22, 1976

[51] Int. Cl.$^2$ .............................................. A23K 3/00
[52] U.S. Cl. ........................................ 426/2; 426/72; 426/74; 426/97; 426/311; 426/807
[58] Field of Search ..................... 426/302, 321, 2, 72, 426/97, 74, 310, 311, 807, 656, 630, 648, 654, 541; 424/251; 260/251.5

[56] References Cited

U.S. PATENT DOCUMENTS

| 3,196,018 | 7/1965 | Galler | 426/96 X |
| 3,786,123 | 1/1974 | Katzen | 426/807 X |

OTHER PUBLICATIONS

Rose et al., "The Condensed Chemical Dictionary" 7th Edition, Van Nostrand Reinhold Publishers, 1970, pp. 87 & 231.

Primary Examiner—R. B. Penland
Attorney, Agent, or Firm—Brooks, Haidt, Haffner & Delahunty

[57] ABSTRACT

Animal-feed products comprising folic acid encapsulated in combination with certain protective materials, together with methods for producing and using such products.

12 Claims, No Drawings

FOLIC ACID ANIMAL FEED MATERIALS AND PROCESSES

BACKGROUND OF THE INVENTION

The present invention relates to a novel protected folic acid for use in animal feed premixes and in animal feeds, and more particularly, it relates to compositions comprising folic acid in combination with selected protective agents encapsulated for use in animal feeds and animal-feed premixes, together with processes for obtaining such materials and methods for the use thereof.

As is well known, domestic farm animals which are raised for their economic value in the production of meat, eggs, milk, butter, and like products require a basic nutritional diet containing proteins or other nitrogen sources, carbohydrates, and fat. The amount of the particular nutritional ingredient depends upon the type of animal, such as bovine, gallinaceous, swine, and the like, as well as the purpose for which the livestock is being kept or groomed. Thus, in the case of poultry, a different diet may be required for broilers or other animals in which quick growth is desirable, than would be required by hens for egg-laying.

In addition to the various basic nutritive materials which are required by livestock, it is well recognized that a variety of other nutrients are required in order to assure good growth, health, feed efficiency, and the like. Some of these substances are required in such small amounts that they are referred to as "micronutrients," but they are required or highly desirable in animal feeds, despite the relatively small quantities employed.

Many of these ingredients involve traces of compounds of metallic elements such as cobalt, magnesium, manganese, and iron, to name but of few of the desired mineral elements. In addition to these requirements for mineral elements, there is also a considerable requirement for a variety of organic materials. Here again, these are well-known and include vitamins such as Vitamins A, C, E, and K, as well as a variety of the "B" vitamins. One of the B vitamins desirably used in animal feeds is folic acid, which has also been called Vitamin Bc and Vitamin M. The presence of this vitamin is believed to improve the utilization of iron in the animal and promote improved growth.

It is accordingly desirable that such materials be added to the feed given to animals. Because of the relatively small quantities of these materials required in the animal diet and because of the variation required among various types of livestock, it is extremely inconvenient and difficult, if not impossible, for the feed manufacturer to add the required quantities of such materials directly to animal feeds. This is true not only because of the extremely small amounts of materials required but also due to the difficulty of obtaining and storing such materials, many of which are sensitive to various conditions of heat, pH, moisture, and so on.

It has accordingly become desirable to provide a means so that the feed manufacturer can ensure fulfillment of the animal nutrition requirements in an effective and convenient manner. Accordingly, for such purposes various animal feed premixes are prepared. Since it is desirable that such premixes contain a number of nutritive or supplemental materials, it has become customary to incorporate both organic materials, such as the essential vitamins, and the metal trace elements, in a single premix. Such premixes have become known as multivitamin-mineral or "MVM" premixes.

While such MVM premixes are quite convenient for use by the ultimate user in preparing animal feeds, it has been found that many of the ingredients in such MVM premixes are antagonistic to one another, and that a good deal of the potency of the premix materials in the finished animal feed can be lost during treatment and storage. This problem has been recognized, and many products and methods have been developed to ameliorate the difficulties. One of the materials which was found to be quite useful in animal nutrition is Vitamin K and a great deal of effort has gone into the preparation of animal feeds containing Vitamin K-active materials and precursors therefor. Thus, Galler, U.S. Pat. No. 3,196,018 shows a process for the production of animal feed premixes containing water-soluble Vitamin K substances which are coated with a non-toxic protective film.

THE INVENTION

The present invention rests on the discovery that the combination of folic acid with certain protective ingredients can be used to provide a coated product which has excellent potency and stability over a wide range of storage and use conditions in MVM premixes and the feeds prepared therefrom. Briefly, the present invention involves the stabilization of folic acid in animal feed materials by combining the folic acid and at least one protective agent, as herein described, and coating the combination of folic acid and the protective agent or agents with an integument to produce microcapsules of protected folic acid. The invention also provides animal feed premixes and animal feeds containing protected folic acid as well as various processes for producing the several products.

As noted above, folic acid is a nutritional material, and it has also been known as the *Lactobacillus casei* factor. Chemically, it has also been trivially denominated as pteroylglutamic acid, and is stated to be N-(p-[(2-amino-4-hydroxypyrimido[4,5b]pyrazin-6-ylmethyl)-amino]-benzoyl) glutamic acid.

The protective agents for folic acid found according to the present invention are mixtures of monocalcium phosphate and citric acid, mixtures of trisodium citrate and ascorbic acid, potassium dihydrogen orthophosphate, alkali-metal ascorbates, and mixtures thereof. In certain embodiments of the present invention, the ratio of monocalcium phosphate to citric acid is desirably from about 80:20 to 20:80 and is preferably 50:50. In another embodiment the ratio of trisodium citrate to ascorbic acid is desirably from about 10:90 to 50:50 and is preferably about 20:80. Unless otherwise indicated, all parts, percentages, proportions and ratios herein are by weight.

Having selected the desired protective agent for use with the folic acid, a wide variety of coating materials can be utilized. The coating materials for use in the present invention are those which are non-toxic to the particular animals in the quantities in which such coating materials are utilized, are resistant to water and moisture, are unaffected by and compatible with the other components of the MVM mixture, and are soluble or otherwise removable by the digestive processes of the particular animal, whether in the stomach, rumen, or intestine, as the case may be.

Thus, the coatings according to the present invention can be natural or modified gums such as acacia, gum tragacanth, guar gum and the like; proteins and peptides, such as casein, zein, gelatin, and the like; polysaccharides including hemicelluloses such as agar, pectins, Irish moss extractive (carrageenen), and the like; starch, chemically modified starch, and the like; cellulose derivatives such as ethyl cellulose, carboxymethylcellulose, cellulose acetate phthalate and the like; natural resins such as shellac and the like; aliphatic acids and anhydrides such as stearic acid, maleic anhydride and the like; aliphatic esters such as glycerylmonostearate and the like; polyvinylpyrollidone and the like; and mixtures thereof.

The folic acid can be used in any available solid form. Thus, it can be used as a powder or as the widely available crystals. In general, it is desirable that the particle size of the folic acid be from about 0.005 millimeters to about 0.025 millimeters. The particle size of the protective agents ranges from about 0.002 millimeters to about 0.050 mm and is desirably from about 0.005 mm to 0.025 mm. It is generally desired that the microcapsules have a size of from about 0.010 millimeters to about 0.100 mm, and in certain preferred embodiments of the invention, the size range is from about 0.020 mm to about 0.040 mm.

After the microcapsules have been formed by phase-separation of the coating material onto the solid particles, the coating is then caused to increase in viscosity and ultimately to harden. If desired, the microcapsules can be hardened just sufficiently for further handling and the remainder of the hardening can be carried out during subsequent operations.

After the coating is formed on the particles, and the material has been hardened, at least to some extent, the capsules are then separated from the carrier medium in which they were formed and subsequently dried or otherwise treated to remove substantially all of the remaining carrier medium.

The carrier medium for the preparation of the small capsules is a liquid in which the coating material is substantially soluble in the amounts used, but which will not dissolve the folic acid or the associated protective agent to any marked degree. The medium should be readily removable from the capsules, as well as non-toxic. The carrier media for the encapsulation according to the present invention include aliphatic alcohols, desirably the lower alkyl alcohols having from two to about five carbon atoms such as ethanol, propanol, isopropanol, butanol, and the like; esters, desirably the lower alkyl esters such as ethyl acetate and the like; aromatic hydrocarbons including lower alkyl-substituted hydrocarbons such as benzene, toluene, xylene and the like; ketones, desirably lower alkyl ketones such as acetone, 2-butanone, and the like; and nitroparaffins desirably lower alkyl nitroparaffins, such as nitroethane and the like.

The quantity of carrier medium used will depend upon the particular sizes of the folic acid and protective agent particles, the protective agent used, the coating material used, and the desired properties of the finished capsules. Generally, the concentration of coating material is from about 5 to about 80 percent, and in certain preferred embodiments is from about 20 percent to about 40 percent. The quantity of folic acid and protective agent will be in the ratio of about 1:1 to about 4:1 of the coating material.

The initial separation of the microcapsules can be carried out by gross liquid-solid separation methods such as filtration, such as on a Buchner funnel, filter paper, filter press or the like, by sedimentation and decantation, centrifugation, and the like. The further or final drying can then be carried out in a heated oven, on a roller mill, or in a fluidized bed, using convection, radiant or other heating, as appropriate. The coated particles can also be subjected to a vacuum substantially to remove the remaining carrier medium, and this can be desirable if the carrier medium is present in large quantities and is relatively expensive.

Other processes for the preparation of the microcapsules of the crystal can also be used. Thus they can be prepared by spray-drying techniques, thin-film extrusion, and the like.

Following the preparation of the stabilized folic acid capsules, they can then be incorporated into animal feed premixes and animal feeds as described herein. As used in this disclosure, the term animal feed premix is taken to mean a relatively concentrated product which can be utilized by a feed manufacturer or a farmer in preparing the finished material for feeding to animals. The animal feed premix can be entirely comprised by the MVM mixture or it can be the MVM mixture further diluted or admixed with other materials, or it can contain the protected folic acid capsules and other materials as taught herein. The animal feed is the finished composition containing the desired nutrients ready for feeding to the animals.

In certain preferred embodiments of the present invention, an animal feed MVM premix contains folic acid in an amount of from about 10 mg to 10 g of folic acid to each pound of premix. In subsequent animal feeds, the level of folic acid is about 50 mg to about 5 g of the acid for each ton of animal feed.

In preparing the premix, the MVM mixture and/or the folic acid can additionally be combined with a variety of nutrients and other materials suitable for incorporation into animal feeds. The materials for admixture in the preparation of the premix are generally digestible by the animal so that they provide a further function in the feed and improve its efficiency in this respect. Among the digestible materials which are employed in the preparation of premixes according to the present invention are cornmeal, corncob meal, milo, soybean oil meal, alfalfa meal, dried whey, wheat shorts, distillers' dried solubles, salt, meat scraps, butyl fermentation solubles, feather meal, poultry by-products, wheat middlings, dextrose, lactose meal, dried kelp, linseed oil meal, oatmeal, dried yeast, wheat bran, calcite flour, and the like. The finished feed can be prepared by adding further quantities of these or other nutrients or fibrous materials to the premix.

It should especially be noted that the compositions for the preparation of feed according to the present invention exhibit excellent stability under the heat and temperature conditions which are frequently utilized in preparing feeds for farm animals. The feeds are generally used in forms such as mash, pellets, or crumbles. A mash is a dry mixture of the various gross feed ingredients together with the desired MVM materials. Pellets are comprised of mash which is subjected to elevated temperatures and pressures, often in the presence of steam, to provide shapes of various types. An extremely popular shape for pellets is the form of small cylinders which can vary in length and diameter and are frequently produced by extrusion. Crumbles are a form of pellets which are broken, or alternatively, crumbles sometimes indicate pellets of relatively small size. It has been established that pelleted feed provides a greater weight gain for each unit of feed consumed by the animal than mash, and crumbles are particularly advantageous in feeding younger animals or smaller farm animals such as poultry.

It has been said that about 55 percent of all manufactured feed is produced in the form of pellets or crumbles and in many areas, as much as 80 percent of all feed is pelletized. This is significant from the standpoint of the present invention because of the high temperatures and moisture contents which are encountered. Thus, temperatures can reach 600° F for a short ime and a steamed mash prior to pelletizing may be as hot as 250° F. As the pellets emerge from the die, their temperature can be at about 400° F and the extrusion pressure can reach 65,000 pounds per square inch (psi) for a short time.

The present invention is supported by extensive testing. Folic acid has been found to support the growth of strains of *Lactobacillus casei*, and this biological test method is used in assaying the folic acid to ascertain the protection provided. The stability trials are carried out using the severest conditions encountered in the ordinary storage of animal feed, that is, 28° C at 75% relative humidity.

In the test described in the following Examples, the samples of the compositions to be tested, are packed in two-ply paper sacks and then retained for the stated periods of time. The temperature is readily controlled in a temperature room, and the humidity is obtained by suspending the samples over saturated sodium chloride solutions, with "Mason" (or "Kilner") jars utilized to prevent evaporation losses from salt solutions. After the retention under the stress conditions, the products are assayed as noted below.

The extraction solution is prepared by dissolving 10 g of L-ascorbic acid in 500 ml of distilled water in a one-liter volumetric flask and adding 20 ml of ammonia and water to make 1,000 ml. The extraction is carried out by weighing 10 g of the test material and transferring it quantitatively to a 250 ml Erlenmeyer flask, whereupon 100 ml of the extraction solution is added and the flask is plugged with cotton wool.

After addition of the extraction solution and plugging with cotton wool, the flask is agitated in an orbital shaker for one hour to insure complete extraction of the premix. The resultant extract is thereupon centrifuged to provide a clear solution, and 10 ml of the solution is transferred to a 10 ml air-tight culture tube and stored at 0° C until used for assay. To insure accuracy, the procedure is carried out in triplicate on each test mixture.

After appropriate dilution, the extracts are assayed using a chloramphenicol-resistant strain derived from the original Wold-type *Lactobacillus casei* (ATCC. 7469, National Culture for Industrial Bacteria, No. 10463).

The following examples are given to illustrate embodiments of the invention as it is presently preferred to practice it. It will be understood that these examples are illustrative, and the invention is not to be considered as restricted thereto except as indicated in the appended claims.

EXAMPLE I

A mixture of 400 g of monocalcium phosphate and 400 g of citric acid is prepared by tumbling these dry ingredients in a drum. Then, 800 g of folic acid crystals is added and tumbled. The particle size of the folic acid crystals is 0.020 mm; the particle size of the monocalciumphosphate is 0.020 mm; and the particle size of the citric acid is about 0.020 mm. After ten minutes of tumbling, the folic acid crystals and the protective agent crystals are found to be homogeneously mixed.

After preparation of the protected folic acid mixture, 1029 g of the mixture is added to 343 g of ethyl cellulose dissolved in 1578 g of ethanol. Thereupon 500 g of isopropyl alcohol is added with stirring to provide a slurry of crystals, encapsulated in ethyl cellulose, in the organic solution.

The encapsulated crystals are separated from the solution by allowing the capsules to settle, and pouring off the solution. The capsules are then washed with hexane, or petroleum ether to harden the coating, for about one hour. The capsules are separated from the washing media by filtration on a Buchner funnel. The filter cake is spread out to air-dry and provide discrete micro-capsules.

The product so produced is then used to prepare a premix for animal feeds by adding 0.03 percent of the encapsulated crystals to an MVM animal feed premix containing Vitamins A, D, E, $B_{12}$, K, riboflavin, niacin, choline chloride, thiamine, pyridoxine hydrochloride, ethoxyquin, zinc oxide, manganous oxide, iron carbonate, copper oxide, starch and solulac. The animal-feed premix has excellent storage properties, and more than 95% of the folic acid values are maintained over a long period of storage, on the order of 6 months under normal storage conditions. The animal feed premix is subsequently added to a combination of oats and alfalfa in the ratio of 1000 – 1500 g of premix to each ton of feed. Such feed is suitable for raising poultry. These animal feeds are given to poultry.

EXAMPLE II

A mixture of folic acid and protective agent is prepared by blending in a Patterson-Kelly double-cone dry blender 100 g of folic acid crystals having a particle size of 0.020 mm and a 4:1 mixture of ascorbic acid and trisodium citrate in an amount of 125 g. The blending is continued for 10 minutes until a homogeneous product results. A mixing vessel fitted with a reflux condenser is then charged with 1000 g of 4% ethyl cellulose solution in cyclohexane, and 120 g of the folic acid-protective agent mixture and 20 g of paraffin wax are then added. This slurry is heated with controlled agitation to 80° C held for 15 minutes and thereupon cooled slowly to room temperature.

This provides protected folic acid with a coating of ethyl cellulose plasticized with paraffin wax. The resulting coated protective folic acid is filtered in a Buchner funnel, and air dried on the funnel. The encapsulated stabilized folic acid is suitable for use in animal feeds.

EXAMPLE III

A homogeneous mixture of 200 g of folic acid and 100 g of potassium dihydrogen orthophosphate is prepared, and 240 g of this mixture is charged into a mixing vessel together with 400 ml of 20% aqueous gelatin solution and 400 of isopropanol. The resulting slurry is thoroughly mixed at 30°–35° C, and a further 800 ml portion of 50% aqueous isopropanol is added.

The temperature is permitted to drop slowly to 10° C, at which point the agitation is stopped and the coated crystals are removed from the mixture by filtration. The product is thereupon washed on the filter with isopropanol and air-dried.

The product of Example I is then used to prepare a multivitamin-mineral animal feed premix according to the formula shown in Table I.

TABLE I

| Multivitamin-Mineral Premix | |
|---|---|
| Ingredients | Weight (g) |
| Rovimix A-650 (650,000 u/gm) Vitamin A | 47.67 |
| Rovimix AD₃ 325/325 Vitamin D | 31.78 |
| Vitamin E 125 powder | 112.59 |
| Vitamin B₁₂ 2000 mg/lb | 11.35 |
| Vitamin K | 297.75 |
| Riboflavin 95.5% | 32.23 |
| Niacin 98% | 58.11 |
| d-Calcium Pantothenate 100% | 58.11 |
| Choline Chloride 50% | 6583.0 |
| Thiamine Mononitrate 100% | 5.0 |
| Pyridoxine HCl | 5.0 |
| Ethoxyquin 66⅔% | 763.63 |
| Manganous Oxide 55% | 705.97 |
| Iron Carbonate 47% | 552.06 |
| Copper Oxide 75% | 34.05 |
| Ethylene Diamine Dihydriodide (EDDI) 79.5% | 12.71 |
| Zinc Oxide 72% | 348.06 |
| Starch | 242.89 |
| Solulac (Distillers Dried Solubles) | 13,284.04 |
| | 23,186.00 |

Then, 7.34 g of the encapsulated, protected folic acid is added to provide 0.011% of folic acid. A blank is prepared by adding unprotected folic acid in the amount of 2.57 g to provide the same level of folic acid.

In order to test the stability of this composition, it is tested at the high temperature and humidity stress conditions described above. In the test, approximately 120 g of material are packed in each of the bags. The retention of folic acid in these tests is shown in Table II.

TABLE II

| | Storage Time | |
|---|---|---|
| Product | 2 Weeks | 6 Weeks |
| *Folic Acid | 73% | 52% |
| *Protected, Encapsulated Folic Acid | 100% | 99% |

*Average of 4 separate tests.

The foregoing tests are repeated utilizing equivalent amounts (based upon the folic acid content) of unprotected folic acid, encapsulated folic acid, and encapsulated, protected folic acid. The results of the retention of folic acid in these tests are shown in Table III.

TABLE III

| | Storage Time | | |
|---|---|---|---|
| Product | 2 Weeks | 4 Weeks | 6 Weeks |
| Folic Acid | 68% | 53% | 48% |
| Encapsulated Folic Acid | 90% | 73% | 64% |
| Protected Encapsulated Folic Acid | 100% | 99% | 100% |

The foregoing data are typical of the results obtained according to the present invention and well illustrate the great improvement in folic acid retention which is obtained as a result of the present processes and products.

What is claimed is:

1. A process for the stabilization of folic acid in animal feed materials which process comprises mixing folic acid with a protective agent which is a mixture of monocalcium phosphate and citric acid, a mixture of trisodium citrate and ascorbic acid, potassium dihydrogen orthophosphate, alkali metal ascorbates, or mixtures thereof and encapsulating the mixture in a non-toxic moisture-resistant coating material.

2. A process according to claim 1 wherein the protective agent is a mixture of from about 80:20 to about 20:88 monocalcium phosphate: citric acid.

3. A process according to claim 1 wherein the protective agent is a mixture of from about 10:90 to about 50:50 trisodium citrate: ascorbic acid.

4. A process according to claim 1 wherein the protective agent is potassium dihydrogen orthophosphate.

5. A process according to claim 1 wherein the ratio of folic acid to protective agent is from 1:15 to 10:1.

6. A process according to claim 1 wherein the particle size of the folic acid is from about 0.005 to about 0.025 mm.

7. A process according to claim 1 wherein the particle size of the folic acid is from about 0.002 to about 0.100 mm.

8. A process according to claim 1 wherein the particle size of the encapsulated mixture is from about 0.010 to about 0.100 mm.

9. A stabilized folic acid for use in the preparation of animal feed materials which comprises a mixture of folic acid and a protective agent, said protective agent is a mixture of monocalcium phosphate and citric acid, a mixture of trisodium citrate and ascorbic acid, potassium dihydrogen orthophosphate, alkali metal ascorbates, or mixtures thereof, the mixture of folic acid and the protective agent being encapsulated in a non-toxic water-resistant coating material.

10. An animal feed premix having folic acid activity which premix comprises from 10 mg to 10 g of the stabilized folic acid of claim 9 for each pound of premix.

11. An animal feed having folic acid activity which feed comprises from 50 mg to 5 g of the stabilized folic acid of claim 9 for each ton of feed.

12. A process for providing animals with their folic acid requirements which comprises adding from 50 mg to 5 g of the stabilized folic acid of claim 9 for each ton of animal feed materials and supplying the protected folic acid-containing feed to the animals.

* * * * *

UNITED STATES PATENT AND TRADEMARK OFFICE
CERTIFICATE OF CORRECTION

PATENT NO. : 4,087,556
DATED : May 2, 1978
INVENTOR(S) : Kevin Michael Harte

It is certified that error appears in the above-identified patent and that said Letters Patent are hereby corrected as shown below:

Col. 5, line 9   "ime" should read "time"

Col. 8, line 14  "20:88" should read "20:80"

Col. 8, line 15  "claim wherein" should read "claim 1 wherein"

Col. 8, line 21  "1:15" should read "1:5"

Signed and Sealed this

Tenth Day of October 1978

[SEAL]

Attest:

RUTH C. MASON
*Attesting Officer*

DONALD W. BANNER
*Commissioner of Patents and Trademarks*